(12) United States Patent
Kim et al.

(10) Patent No.: US 9,143,224 B2
(45) Date of Patent: Sep. 22, 2015

(54) APPARATUS AND METHOD OF AUTOMATICALLY MANAGING SATELLITE BROADCASTING SERVICE

(71) Applicant: ELECTRONICS AND TELECOMMUNICATIONS RESEARCH INSTITUTE, Daejeon (KR)

(72) Inventors: In Jun Kim, Daejeon (KR); Won Chan Jung, Daejeon (KR); Jae Hoon Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 173 days.

(21) Appl. No.: 13/908,080

(22) Filed: Jun. 3, 2013

(65) Prior Publication Data

US 2014/0094113 A1    Apr. 3, 2014

(30) Foreign Application Priority Data

Sep. 28, 2012    (KR) .................. 10-2012-0108469

(51) Int. Cl.
*H04B 7/185* (2006.01)

(52) U.S. Cl.
CPC ........ *H04B 7/18519* (2013.01); *H04B 7/18523* (2013.01)

(58) Field of Classification Search
CPC ........... H04B 7/18513; H04B 17/0045; H04B 17/0057; H04B 17/007; H04B 7/10; H04B 7/18534; H04B 7/18578; H04B 7/18595; H04B 7/18519; H04B 7/18523; H01Q 19/17; H01Q 1/288; H04W 84/06
See application file for complete search history.

(56) References Cited

U.S. PATENT DOCUMENTS

| | | | |
|---|---|---|---|
| 7,047,029 B1 * | 5/2006 | Godwin et al. ............... 455/505 |
| 7,801,101 B2 | 9/2010 | Shin et al. | |
| 2003/0054816 A1 | 3/2003 | Krebs et al. | |
| 2005/0141472 A1 | 6/2005 | Shin et al. | |

FOREIGN PATENT DOCUMENTS

| | | |
|---|---|---|
| KR | 1020000015489 A | 3/2000 |
| KR | 1020110061309 A | 6/2011 |

* cited by examiner

*Primary Examiner* — Golam Sorowar
(74) *Attorney, Agent, or Firm* — Ladas & Parry LLP

(57) ABSTRACT

An apparatus and a method for automatically managing a satellite broadcasting service are disclosed. The apparatus may include a rain attenuation information collection unit to measure weather information and a satellite broadcast signal and to collect and provide satellite broadcast signal quality information corresponding to rain attenuation, a rain attenuation analysis unit to analyze rain attenuation information collected by region and to verify a rain attenuation level, a satellite broadcast transmission signal plan unit to generate a satellite broadcast signal change plan to change a satellite broadcast transmission signal by region based on the verified rain attenuation level, and a satellite broadcast transmission signal controller to transmit a signal change instruction to a satellite ground station for the satellite broadcast transmission signal to be changed based on the generated satellite broadcast signal change plan.

10 Claims, 5 Drawing Sheets

APPARATUS AND METHOD OF AUTOMATICALLY MANAGING SATELLITE BROADCASTING SERVICE

CROSS-REFERENCE TO RELATED APPLICATION

This application claims the priority benefit of Korean Patent Application No. 10-2012-0108469, filed on Sep. 28, 2012, in the Korean Intellectual Property Office, the disclosure of which is incorporated herein by reference.

BACKGROUND

1. Field of the Invention

The present invention relates to an apparatus and a method for automatically managing a satellite broadcasting service to secure continuity of a broadcasting service against rain attenuation using a satellite. More particularly, the present invention relates to a technical concept of analyzing an impact of rain attenuation measured on the ground, and automatically changing a satellite broadcast signal transmission mode for a satellite broadcast signal that has low data transmission efficiency but is strong against rain attenuation in case of impact of rain attenuation to be provided by a satellite transmitting a satellite broadcast signal to regions using a multi-beam.

2. Description of the Related Art

Rain attenuation may refer to attenuation of radio frequencies.

Due to a high frequency of radio waves, scattering occurs when raindrops have a non-negligible size with respect to a wavelength of the radio waves, such that attenuation increases.

Attenuation of millimeter or submillimeter waves may occur by resonance of oxygen or vapor molecules in the air, wherein rain causes a considerably significant amount of attenuation and poses a serious obstacle to use of such frequency bands.

A general rain attenuation compensation technique changes a modulation and demodulation method or a coding method to continuously maintain a transmission link, even in a low signal level, when a signal quality deteriorates due to rain.

However, for the rain attenuation compensation technique to be introduced into actual services, there is a need for a rain attenuation management system that analyzes and applies weather conditions or a rain attenuation level to satellite broadcasting services immediately.

An apparatus for measuring and collecting rain attenuation is suggested, while management technology for satellite broadcasting using the apparatus is not presented. Also, a technology for changing a transmission signal to avoid interruptions in the service has been developed.

SUMMARY

According to an aspect of the present invention, there is provided an apparatus for automatically managing a satellite broadcasting service, the apparatus including a rain attenuation information collection unit to measure weather information and a satellite broadcast signal, and collect and provide satellite broadcast signal quality information corresponding to rain attenuation, a rain attenuation analysis unit to analyze rain attenuation information collected by region and to verify a rain attenuation level, a satellite broadcast transmission signal plan unit to generate a satellite broadcast signal change plan to change a satellite broadcast transmission signal, by region, based on the verified rain attenuation level, and a satellite broadcast transmission signal controller to transmit a signal change instruction to a satellite ground station for the satellite broadcast transmission signal to be changed based on the generated satellite broadcast signal change plan, wherein the satellite ground station receives the transmitted signal change instruction, and a broadcast satellite accounts for the rain attenuation by transmitting a satellite broadcast signal transmitted from the satellite ground station to a region having an optimal signal state through a multi-beam.

The apparatus may further include a database to store regional satellite broadcast subscriber information, wherein the satellite broadcast transmission signal controller may verify regional satellite broadcast subscriber information about a region to be provided with a satellite broadcast signal change service from the database and generate the signal change instruction based on the verified regional satellite broadcast subscriber information.

The rain attenuation information collection unit may collect rain attenuation information data including the weather information and the satellite broadcast signal from a device disposed in each region and provide the data to the rain attenuation analysis unit by inserting an identifier (ID) and a time tag as data generation time into a header of the collected rain attenuation information data, and the rain attenuation analysis unit may analyze the provided rain attenuation information data and determine a rain attenuation level.

The rain attenuation analysis unit may classify the provided rain attenuation information data regionally, and determine whether the satellite broadcasting service is interrupted due to rain attenuation by applying a separate rain attenuation model, by region, to the classified rain attenuation information data.

The satellite broadcast transmission signal plan unit may generate the satellite broadcast signal change plan to change the satellite broadcast transmission signal, by region, when it is determined that the satellite broadcasting service will be interrupted as a result of determining whether the satellite broadcasting service is being interrupted.

The satellite broadcast transmission signal controller may control a satellite broadcast signal transmission device included in the satellite ground station to change an actual satellite broadcast transmission signal.

According to an aspect of the present invention, there is provided a method of automatically managing a satellite broadcasting service, the method including a rain attenuation information collection unit collecting and providing satellite broadcast signal quality information corresponding to rain attenuation by measuring weather information and a satellite broadcast signal, a rain attenuation analysis unit analyzing rain attenuation information collected by region and verifying a rain attenuation level, a satellite broadcast transmission signal plan unit generating a satellite broadcast signal change plan to change a satellite broadcast transmission signal, by region, based on the verified rain attenuation level, and a satellite broadcast transmission signal controller transmitting a signal change instruction to a satellite ground station for the satellite broadcast transmission signal to be changed based on the generated satellite broadcast signal change plan, wherein the satellite ground station receives the transmitted signal change instruction, and a broadcast satellite accounts for the rain attenuation by transmitting a satellite broadcast signal transmitted from the satellite ground station to a region having an optimal signal state through a multi-beam.

The method may further include a database storing regional satellite broadcast subscriber information, wherein the transmitting of the signal change instruction to the satellite ground station by the satellite broadcast transmission signal controller may include verifying regional satellite broadcast subscriber information about a region to be provided with a satellite broadcast signal change service from the database, and generating the signal change instruction based on the verified regional satellite broadcast subscriber information.

The collecting and providing of the satellite broadcast signal quality information may include collecting rain attenuation information data including the weather information and the satellite broadcast signal from a device disposed in each region, and providing the data to the rain attenuation analysis unit by inserting an identifier (ID) and a time tag as data generation time into a header of the collected rain attenuation information data, and the analyzing of the rain attenuation information collected by region and the verifying of the rain attenuation level by the rain attenuation analysis unit may include analyzing the provided rain attenuation information data and determining a rain attenuation level.

The analyzing of the rain attenuation information collected by region and the verifying of the rain attenuation level by the rain attenuation analysis unit may include classifying the provided rain attenuation information data into regionally, and determining whether the satellite broadcasting service is interrupted due to rain attenuation by applying a separate rain attenuation model, by region, to the classified rain attenuation information data.

The transmitting of the signal change instruction to the satellite ground station by the satellite broadcast transmission signal controller may include generating the satellite broadcast signal change plan to change the satellite broadcast transmission signal, by region, when it is determined that the satellite broadcasting service will be interrupted as a result of determining whether an interruption to the satellite broadcasting service is being interrupted.

The transmitting of the signal change instruction to the satellite ground station by the satellite broadcast transmission signal controller may include controlling a satellite broadcast signal transmission device included in the satellite ground station to change an actual satellite broadcast transmission signal by transmitting the signal change instruction.

As described above, exemplary embodiments of the present invention may monitor regional precipitation conditions of a satellite broadcasting service in real time to determine a deterioration in satellite broadcasting service quality due to rain attenuation, and automatically change a satellite broadcast transmission signal, by region, based on a determination result, thereby automatically securing continuity of the satellite broadcasting service without intervention of a system administrator.

Further, exemplary embodiments of the present invention may collect rain attenuation information by region and set up management plans for satellite broadcasts immediately, based on the information to change a satellite broadcast transmission signal to a strong signal against rain attenuation for a satellite broadcasting service, thereby providing the broadcasting service absent a need for intervention by a system administrator and interruption to the broadcasting service in a satellite broadcast using a frequency substantially subject to rain attenuation, for example, a Ka band of 20 gigahertz (GHz) to 30 GHz.

In addition, the exemplary embodiments of the present invention may automatically analyze a rain attenuation level to change a satellite broadcast transmission signal without a request from a subscriber to a satellite broadcasting service, thereby providing a level of convenience to the subscriber.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
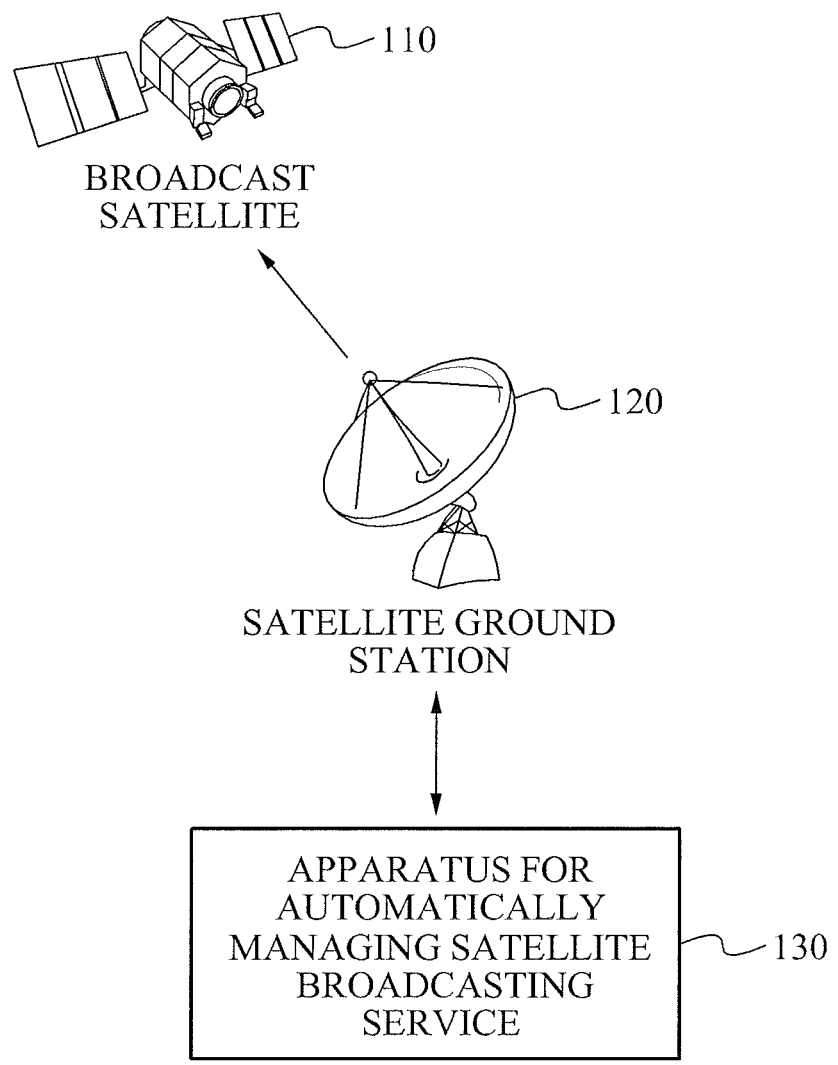
FIG. 1 illustrates a satellite system adopting an apparatus for automatically managing a satellite broadcasting service according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures. When it is determined detailed description related to a related known function or configuration they may make the purpose of the present invention unnecessarily ambiguous in describing the present invention, the detailed description will be omitted here. Also, terminology used herein is defined to appropriately describe the exemplary embodiments of the present invention and thus may be changed depending on a user, the intent of an operator, or a custom. Accordingly, the terminology must be defined based on the following overall description of this specification.

FIG. 1 illustrates a satellite system including an apparatus for automatically managing a satellite broadcasting service according to an exemplary embodiment of the present invention.

The satellite system may include a broadcast satellite 110, a satellite ground station 120, and an apparatus for automatically managing a satellite broadcasting service 130, hereinafter, also referred to as an automatic management apparatus.

The satellite system may monitor precipitation conditions, by region, of a satellite broadcasting service in real time to determine a deterioration in satellite broadcasting service quality due to rain attenuation and automatically change a satellite broadcast transmission signal by region based on a determination result, thereby automatically securing continuity of the satellite broadcasting service without a need for intervention by a system administrator.

To this end, the automatic management apparatus 130 according to the present embodiment accounts for rain attenuation by changing each regional satellite broadcast transmission signal to a strong signal against rain attenuation based on real-time weather information about rain and a rain attenuation level of a satellite broadcast signal, instead of signal processing as a measure for resolving rain attenuation.

In particular, the automatic management apparatus 130 determines rain attenuation conditions by broadcast service regions and automatically controls a change of a transmission signal from a satellite broadcast payload accordingly so as to employ a conventional signal processing method against rain attenuation.

In detail, the automatic management apparatus 130 may measure weather information and a satellite broadcast signal to collect satellite broadcast signal quality information corresponding to rain attenuation and analyze rain attenuation information collected by region to determine a rain attenuation level.

Further, the automatic management apparatus 130 may prepare a plan for changing a satellite broadcast transmission signal, by region, based on the rain attenuation level and control the satellite ground station 120 to change to a planned satellite broadcast transmission signal.

Accordingly, the broadcast satellite 110 may transmit a satellite broadcast signal transmitted from the satellite ground station 120 to a region having an optimal signal state through a multi-beam.

As described above, the automatic management apparatus 130 according to the present embodiment may monitor precipitation conditions of satellite broadcasting service regions in real time to determine a deterioration in satellite broadcasting service quality due to rain attenuation and automatically change a regional satellite broadcast transmission signal, by region, based on a determination result, thereby automatically securing continuity of the satellite broadcasting service without intervention of a system administrator.

Figure 2:
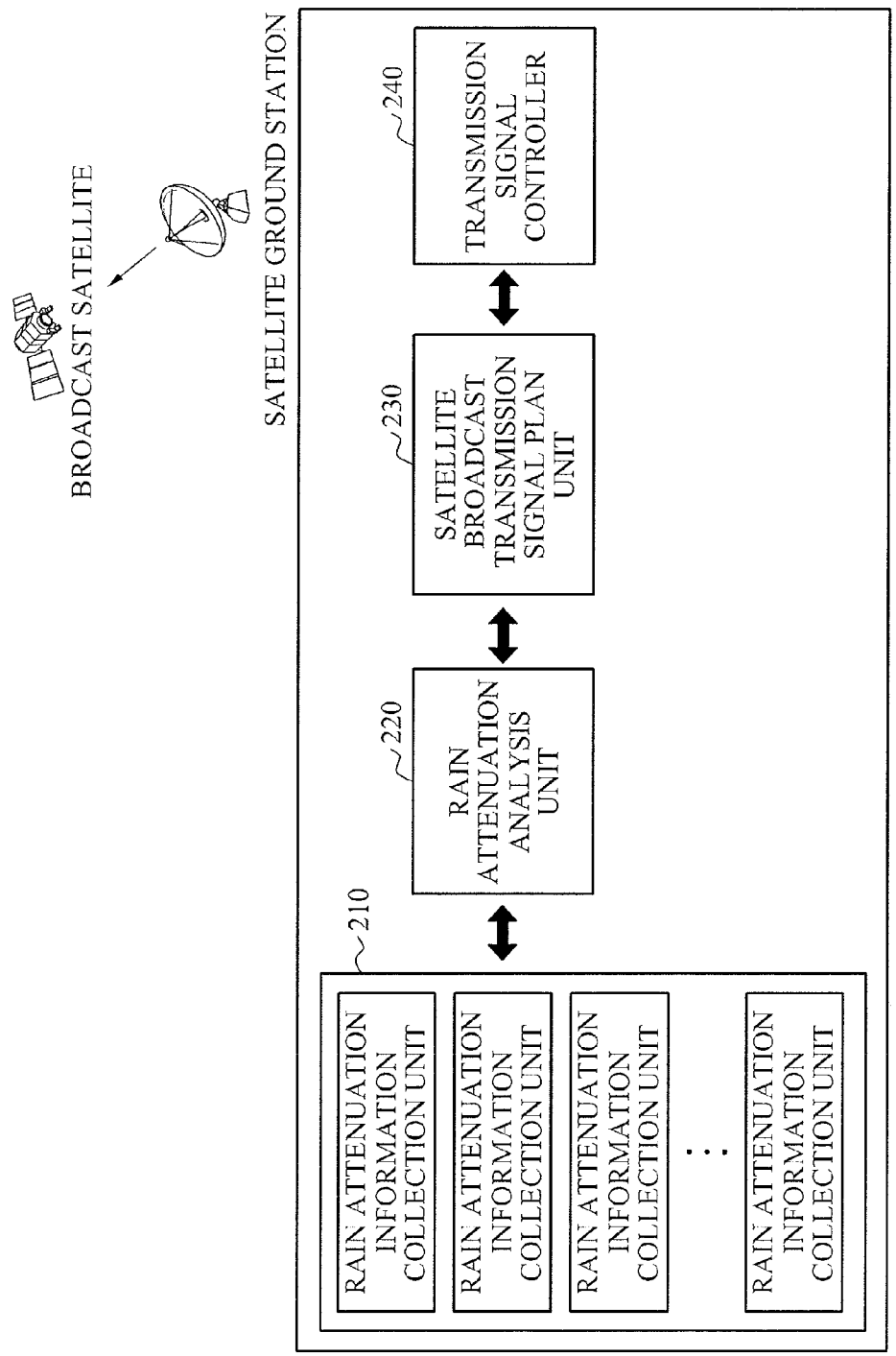
FIG. 2 is a block diagram illustrating an apparatus for automatically managing a satellite broadcasting service according to an exemplary embodiment of the present invention.

FIG. 2 is a block diagram illustrating an apparatus for automatically managing a satellite broadcasting service 200 according to an exemplary embodiment of the present invention.

The apparatus for automatically managing the satellite broadcasting service 200, hereinafter, also referred to as the automatic management apparatus, according to the present embodiment may include a rain attenuation information collection unit 210, a rain attenuation analysis unit 220, a satellite broadcast transmission signal plan unit 230, and a satellite broadcast transmission signal controller 240.

The rain attenuation information collection unit 210 may measure weather information and a satellite broadcast signal to collect and provide satellite broadcast signal quality information corresponding to rain attenuation to the rain attenuation analysis unit 220.

In the present embodiment, the rain attenuation information collection unit 210 may include a plurality of regional rain attenuation information collection devices.

The rain attenuation information collection unit 210 may collect rain attenuation information data including weather information and a satellite broadcast signal from each of the rain attenuation information collection devices and insert an identifier (ID) and a time tag as data generation time into a header of the collected rain attenuation information data.

Further, the rain attenuation information collection unit 210 may provide the rain attenuation information data with the header inserted to the rain attenuation analysis unit 220.

Accordingly, the rain attenuation information measured by the plurality of regional rain attenuation information collection devices is collected in the rain attenuation analysis unit 220.

The rain attenuation analysis unit 220 may receive rain attenuation information about a plurality of locations and collect and classify data on service regions in one beam coverage.

The rain attenuation analysis unit 220 may apply a rain attenuation model for each region to the classified data to determine whether the satellite broadcasting service is interrupted due to rain attenuation and to predict an impact of the rain attenuation.

Accordingly, the rain attenuation analysis unit 220 may analyze rain attenuation information collected by region to verify a rain attenuation level.

To this end, the rain attenuation analysis unit 220 analyzes the collected rain attenuation information by region, and transmits a request for a change of a satellite broadcast transmission signal to the satellite broadcast transmission signal plan unit 230 when the change of the satellite broadcast transmission signal is needed.

The satellite broadcast transmission signal plan unit 230 may generate a satellite broadcast signal change plan to change a satellite broadcast transmission signal, by region, based on the verified rain attenuation level.

The satellite broadcast transmission signal plan unit 230 may create a plan for changing a satellite broadcast transmission signal, by region, based on the request for the change of the transmission signal, thereby building a satellite broadcast signal change plan. The satellite broadcast signal change plan may be used as an input to the satellite broadcast transmission signal controller 240.

For example, the satellite broadcast transmission signal plan unit 230 may plan a regional satellite broadcast transmission signal based on the request for the change of the satellite broadcast transmission signal and transmit the satellite broadcast signal change plan to the satellite broadcast transmission signal controller 240.

The satellite broadcast transmission signal plan unit 230 may change a satellite broadcast signal by controlling equipment of the satellite ground station using a satellite broadcast signal change instruction based on the prepared plan.

The satellite broadcast transmission signal controller 240 may manipulate a satellite broadcast signal transmission device included in the satellite ground station to change an actual satellite broadcast transmission signal, enabling regional users to view a satellite broadcast without interruption even in case of rain.

For example, the satellite broadcast transmission signal controller 240 may transmit a signal change instruction to the satellite ground station for the satellite broadcast transmission signal to be changed based on the generated satellite broadcast signal change plan.

The satellite ground station includes general transmission and reception equipment related to the satellite broadcast signal transmission device, in particular, a device which is capable of setting a transmission mode with high transmission efficiency in low rain attenuation effects, and converting a satellite broadcast signal in a transmission mode with low transmission efficiency but without service interruption in case of high rain attenuation effects.

The satellite ground station may receive the transmitted signal change instruction, and the broadcast satellite may transmit a satellite broadcast signal transmitted from the satellite ground station to a region having an optimal signal state through a multi-beam, thereby dealing with rain attenuation.

The automatic management apparatus 200 according to the present embodiment may further include a database to store regional satellite broadcast subscriber information.

The satellite broadcast transmission signal controller 240 may parse the database to verify regional satellite broadcast subscriber information about a region to be provided with a satellite broadcast signal change service and generate the signal change instruction based on the verified regional satellite broadcast subscriber information.

The database storing regional subscriber information may provide information about a subscriber to a satellite broadcasting service received in a service region of a satellite broadcast signal changed due to rain attenuation.

This information may be used to change a satellite broadcast transmission signal for each subscriber so that at least one of the satellite broadcast transmission signal plan unit 230, the satellite broadcast transmission signal controller 240, and the satellite ground station utilizes the information.

For example, when an interruption to the satellite broadcasting service due to rain attenuation is predicted in a particular region, a changed satellite broadcast transmission signal may be provided only to subscribers in the region with reference to the database in which information about the subscribers in the region is recorded.

When the automatic management apparatus is manually operated by a system administrator, the satellite broadcasting service may be paused due to a time delay of manual operation. Thus, the automatic management apparatus according to the present invention is entirely automated to secure continuity of the satellite broadcasting service.

Figure 3:
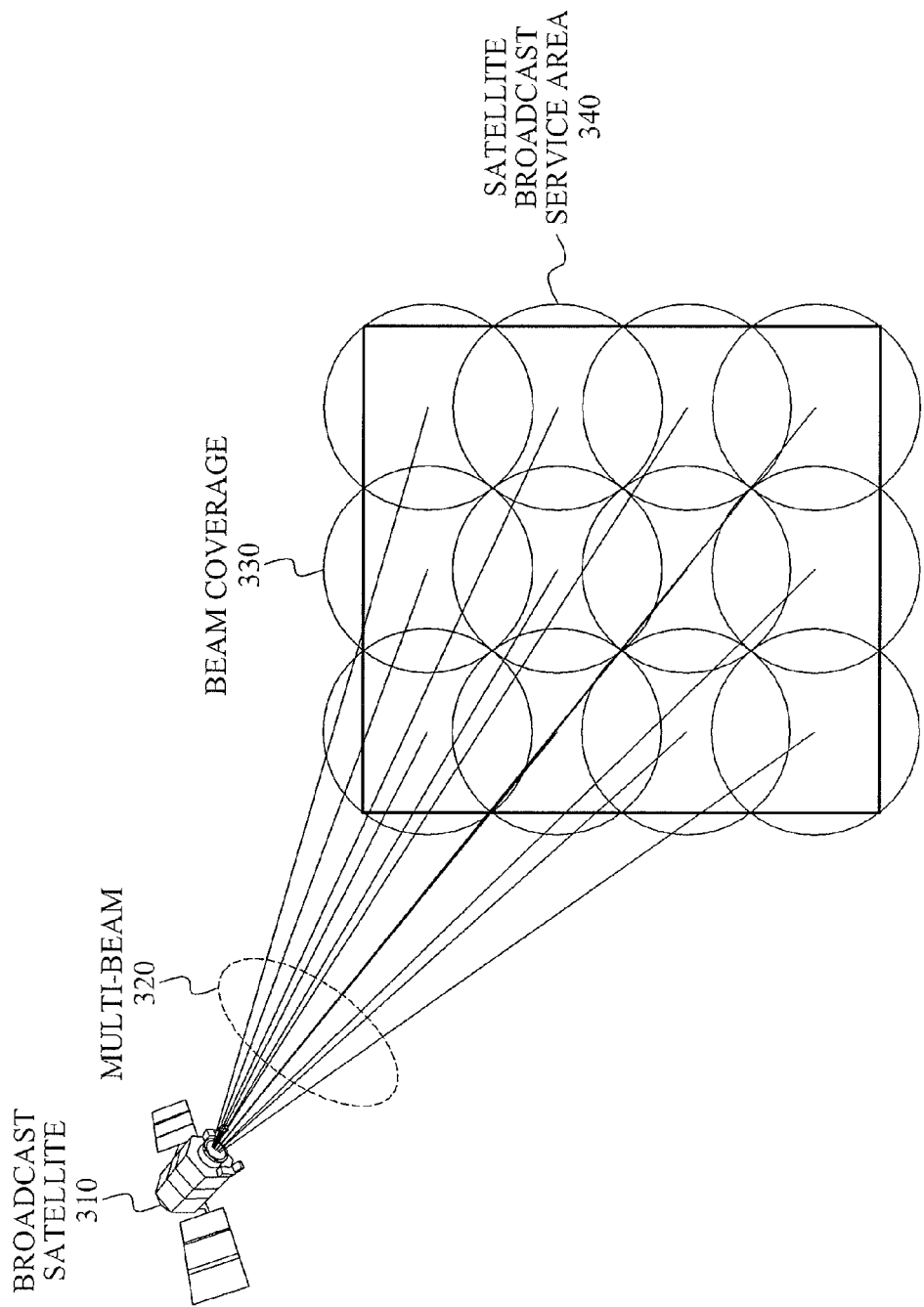
FIG. 3 illustrates a broadcast satellite operated using the apparatus for automatically managing the satellite broadcasting service and a region in which the broadcast satellite provides a satellite broadcasting service using a multi-beam according to an exemplary embodiment of the present invention.

FIG. 3 illustrates a broadcast satellite 310 operated using the automatic management apparatus, and a beam coverage 330 and a satellite broadcast service area 340 in which the broadcast satellite provides a satellite broadcasting service using a multi-beam 320 according to an exemplary embodiment of the present invention.

The broadcast satellite 310 may provide a satellite broadcasting service to a plurality of areas using the multi-beam 320 and be automatically operated so that the automatic management apparatus measures and analyzes rain attenuation in a service area in each beam coverage 330 and provides an optimal satellite broadcast transmission signal.

Figure 4:
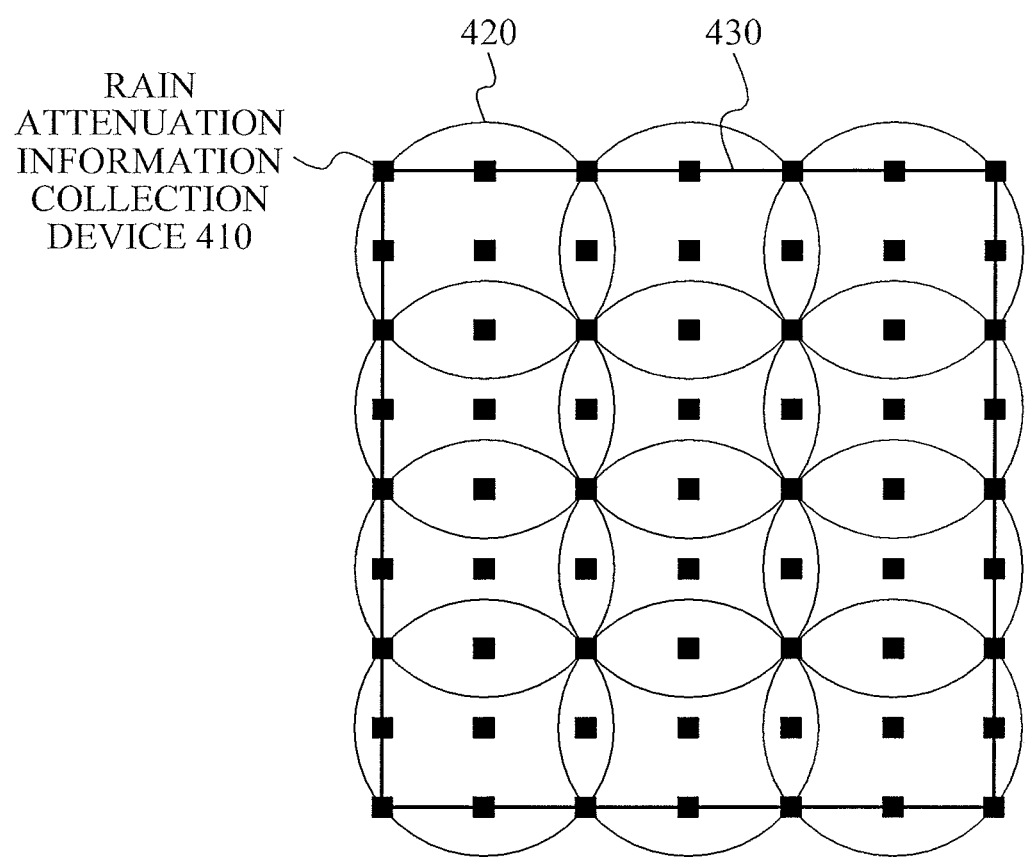
FIG. 4 illustrates an arrangement of rain attenuation information collection devices in each region according to an exemplary embodiment of the present invention.

FIG. 4 illustrates an arrangement of rain attenuation information collection devices in each region according to an exemplary embodiment of the present invention.

FIG. 4 shows an arrangement of rain attenuation information collection devices 410 in each region.

A plurality of rain attenuation information collection devices 410 are disposed in one beam coverage 420 to obtain as much rain attenuation information as possible.

The rain attenuation information collection devices 410 are disposed by region to construct satellite broadcast service areas 430.

Figure 5:
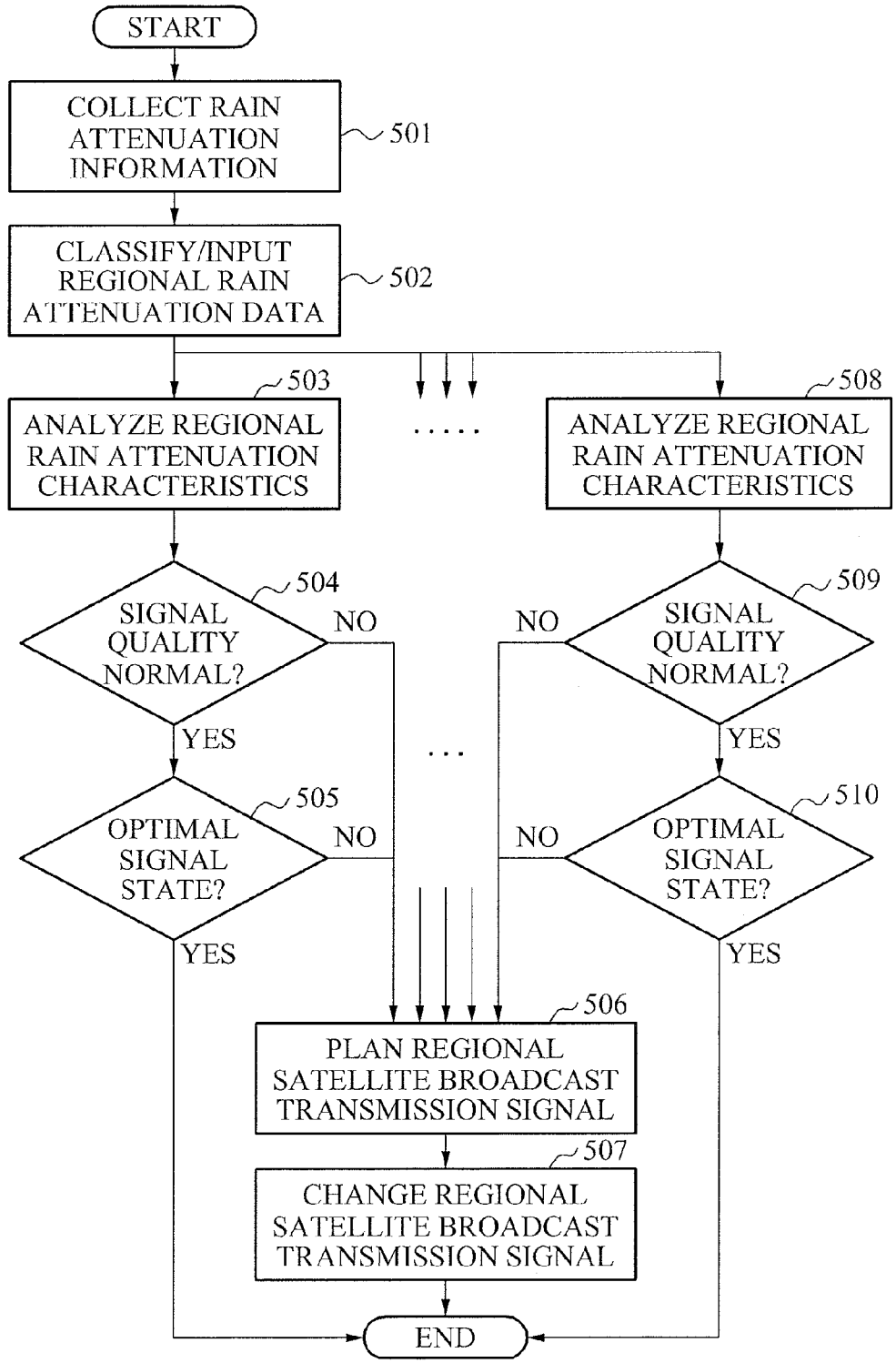
FIG. 5 illustrates a satellite system adopting a method of automatically managing a satellite broadcasting service according to an exemplary embodiment of the present invention.

FIG. 5 illustrates a satellite system adopting a method of automatically managing a satellite broadcasting service according to an exemplary embodiment of the present invention.

The method of automatically managing the satellite broadcasting service, hereinafter, also referred to as the automatic management method, according to the present embodiment may measure weather information and a satellite broadcast signal to collect and provide satellite broadcast signal quality information corresponding to rain attenuation via a rain attenuation information collection unit in operation 501.

That is, the automatic management method may collect a satellite signal attenuation level by rain and measured rainfall intensity data.

The automatic management method may classify the collected information corresponding to rain attenuation into regional rain attenuation data and input the regional rain attenuation data to the rain attenuation analysis unit for analysis in operation 502.

The automatic management method may analyze rain attenuation information collected from each region where a rain attenuation information collection device is disposed using the rain attenuation analysis unit, thereby verifying a rain attenuation level in operations 503 and 508.

For example, the rain attenuation analysis unit may classify the regional rain attenuation data and generate input material, thereby generating input material for analysis of rain attenuation characteristics. The rain attenuation analysis unit may analyze rain attenuation characteristics by employing a regional rain attenuation model using the input material.

Regional rain attenuation characteristics may be analyzed in parallel in operations 503 to 505 and in operations 508 to 510, while such analysis may be conducted in series.

Next, the automatic management method may determine whether signal quality is normal in operations 504 and 509.

When the signal quality is normal, the automatic management method may further verify whether the signal quality is in an optimal signal state in operations 505 and 510.

When the signal quality is in the optimal signal state, the automatic management method may terminate the process.

When the signal quality is abnormal or is not in the optimal signal state, the automatic management method may change a plan for a regional satellite broadcast transmission signal.

In other words, the automatic management method changes a satellite broadcast transmission plan when a signal quality deteriorates or is predicted by the analyzed regional rain attenuation characteristics.

To this end, the automatic management method may enable a satellite broadcast transmission signal plan unit to generate a satellite broadcast signal change plan to change a satellite broadcast transmission signal, by region, based on the verified rain attenuation level in operation 506.

In particular, when it is determined that a change of the satellite broadcast transmission signal is needed, the automatic management method may plan a new satellite broadcast transmission signal for each region.

For example, when signal quality is normal, the automatic management method may determine whether a currently set signal is in an optimal state.

When the currently set signal is not in the optimal state as a result of determination, for example, when a satellite broadcast transmission signal with send data transmission efficiency lowered to reduce impact of rain attenuation is set, the automatic management method may change the satellite broadcast transmission signal in operation 507.

To this end, the automatic management method may transmit a signal change instruction to the satellite ground station for the satellite broadcast transmission signal to be changed based on the generated satellite broadcast signal change plan via a satellite broadcast transmission signal controller.

Subsequently, the satellite ground station may receive the transmitted signal change instruction, and the broadcast satellite may transmit a satellite broadcast signal transmitted from the satellite ground station to a region having an optimal signal state through a multi-beam, thereby dealing with rain attenuation.

As described above, the exemplary embodiments of the present invention may monitor precipitation conditions, by region, of a satellite broadcasting service in real time to determine a decline in satellite broadcasting service quality by rain attenuation and automatically change a satellite broadcast transmission signal, by region, based on a determination result, thereby automatically securing continuity of the satellite broadcasting service without intervention of a system administrator.

Further, the exemplary embodiments of the present invention may collect rain attenuation information by region and set up management plans for satellite broadcasts, immediately, based on the information to change a satellite broadcast transmission signal to a strong signal against rain attenuation for a satellite broadcasting service, thereby providing the broadcasting service without a need for intervention by a system administrator and interruption to the broadcasting service in a satellite broadcast using a frequency to be substantially subjected to rain attenuation, for example, a Ka band.

In addition, the exemplary embodiments of the present invention may automatically analyze a rain attenuation level to change a satellite broadcast transmission signal without a request from a subscriber to a satellite broadcasting service, thereby providing the subscriber with a level of convenience.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for automatically managing a satellite broadcasting service, the apparatus comprising:
a rain attenuation information collection unit to measure weather information and a satellite broadcast signal, and collect and provide satellite broadcast signal quality information corresponding to rain attenuation;
a rain attenuation analysis unit to analyze rain attenuation information collected by region and verify a rain attenuation level;
a satellite broadcast transmission signal plan unit to generate a satellite broadcast signal change plan to change a satellite broadcast transmission signal, by region, based on the verified rain attenuation level; and
a satellite broadcast transmission signal controller to transmit a signal change instruction to a satellite ground station for the satellite broadcast transmission signal to be changed based on the generated satellite broadcast signal change plan,
wherein the rain attenuation information collection unit collects rain attenuation information data comprising the weather information and the satellite broadcast signal from a device disposed in each region and provides the data to the rain attenuation analysis unit by inserting an identifier (ID) and a time tag as data generation time into a header of the collected rain attenuation information data, and the rain attenuation analysis unit analyzes the provided rain attenuation information data and determines a rain attenuation level,
wherein the satellite ground station receives the transmitted signal change instruction, and a broadcast satellite accounts for the rain attenuation by transmitting a satellite broadcast signal transmitted from the satellite ground station to a region having an optimal signal state through a multi-beam.

2. The apparatus of claim 1, further comprising a database to store regional satellite broadcast subscriber information, wherein the satellite broadcast transmission signal controller verifies regional satellite broadcast subscriber information about a region to be provided with a satellite broadcast signal change service from the database, and generate the signal change instruction based on the verified regional satellite broadcast subscriber information.

3. The apparatus of claim 1, wherein the rain attenuation analysis unit classifies the provided rain attenuation information data regionally, and determines whether the satellite broadcasting service is interrupted due to rain attenuation by applying a separate rain attenuation model by region to the classified rain attenuation information data.

4. The apparatus of claim 1, wherein the satellite broadcast transmission signal plan unit generates the satellite broadcast signal change plan to change the satellite broadcast transmission signal by region when it is determined that the satellite broadcasting service will be interrupted as a result of determining whether the satellite broadcasting service is being interrupted.

5. The apparatus of claim 4, wherein the satellite broadcast transmission signal controller controls a satellite broadcast signal transmission device of the satellite ground station to change an actual satellite broadcast transmission signal.

6. A method of automatically managing a satellite broadcasting service, the method comprising:
collecting and providing, by a rain attenuation information collection unit, satellite broadcast signal quality information corresponding to rain attenuation by measuring weather information and a satellite broadcast signal;
analyzing, by a rain attenuation analysis unit, rain attenuation information collected by region and verifying a rain attenuation level;
generating, by a satellite broadcast transmission signal plan unit, a satellite broadcast signal change plan to change a satellite broadcast transmission signal, by region, based on the verified rain attenuation level; and
transmitting, by a satellite broadcast transmission signal controller, a signal change instruction to a satellite ground station for the satellite broadcast transmission signal to be changed based on the generated satellite broadcast signal change plan,
wherein the collecting and providing of the satellite broadcast signal quality information comprises collecting rain attenuation information data comprising the weather information and the satellite broadcast signal from a device disposed in each region, and providing the data to the rain attenuation analysis unit via inserting an identifier (ID) and a time tag as data generation time into a header of the collected rain attenuation information data, and the analyzing of the rain attenuation information collected by region and the verifying of the rain attenuation level by the rain attenuation analysis unit comprises analyzing the provided rain attenuation information data and determining the rain attenuation level, wherein the satellite ground station receives the transmitted signal change instruction, and a broadcast satellite deals with the rain attenuation by transmitting a satellite broadcast signal transmitted from the satellite ground station to a region having an optimal signal state through a multi-beam.

7. The method of claim 6, further comprising storing, in a database, regional satellite broadcast subscriber information, wherein the transmitting of the signal change instruction to the satellite ground station by the satellite broadcast transmission signal controller comprises verifying regional satellite broadcast subscriber information about a region to be provided with a satellite broadcast signal change service from the database, and generating the signal change instruction based on the verified regional satellite broadcast subscriber information.

8. The method of claim 6, wherein the analyzing of the rain attenuation information collected by region and the verifying of the rain attenuation level by the rain attenuation analysis unit comprises classifying the provided rain attenuation information data regionally, and determining whether the satellite broadcasting service is interrupted due to rain attenuation by applying a separate rain attenuation model by region to the classified rain attenuation information data.

9. The method of claim 6, wherein the transmitting of the signal change instruction to the satellite ground station by the satellite broadcast transmission signal controller comprises generating the satellite broadcast signal change plan to change the satellite broadcast transmission signal by region when it is determined that the satellite broadcasting service will be interrupted as a result of determining whether the satellite broadcasting service is being interrupted.

10. The method of claim 9, wherein the transmitting of the signal change instruction to the satellite ground station by the satellite broadcast transmission signal controller comprises controlling a satellite broadcast signal transmission device comprised in the satellite ground station to change an actual satellite broadcast transmission signal by transmitting the signal change instruction.

* * * * *